(12) United States Patent
Jin et al.

(10) Patent No.: US 9,167,520 B2
(45) Date of Patent: Oct. 20, 2015

(54) CONTROLLING APPLICATIONS IN A MOBILE DEVICE BASED ON ENVIRONMENTAL CONTEXT

(71) Applicant: Qualcomm Incorporated, San Diego, CA (US)

(72) Inventors: Minho Jin, Gyeonggi-do (KR); Taesu Kim, Seoul (KR); Kisun You, Suwon (KR); Hyun-Mook Cho, Seoul (KR); Hyung-Il Koo, Seoul (KR); Duck-Hoon Kim, Seoul (KR)

(73) Assignee: QUALCOMM Incorporated, San Diego, CA (US)

(*) Notice: Subject to any disclaimer, the term of this patent is extended or adjusted under 35 U.S.C. 154(b) by 101 days.

(21) Appl. No.: 13/767,028

(22) Filed: Feb. 14, 2013

(65) Prior Publication Data

US 2013/0252597 A1 Sep. 26, 2013

Related U.S. Application Data

(60) Provisional application No. 61/613,457, filed on Mar. 20, 2012.

(51) Int. Cl.
| | |
|---|---|
| *H04W 8/22* | (2009.01) |
| *H04W 52/02* | (2009.01) |
| *H04W 4/04* | (2009.01) |
| *H04M 1/725* | (2006.01) |
| *G06F 1/16* | (2006.01) |

(Continued)

(52) U.S. Cl.
CPC ......... *H04W 52/0225* (2013.01); *G06F 1/1684* (2013.01); *G06F 1/329* (2013.01); *G06F 1/3215* (2013.01); *G06F 1/3231* (2013.01); *H04M 1/72569* (2013.01); *H04W 4/04* (2013.01); *H02J 9/005* (2013.01); *Y02B 60/1289* (2013.01); *Y02B 60/144* (2013.01)

(58) Field of Classification Search
CPC ... H04W 8/245; H04W 4/22; H04W 52/0225; H04M 1/72533
USPC ........ 455/418–420, 414.1, 404.2, 456.1, 135, 455/136, 161.3, 277.2, 452.2; 340/852.2–852.4, 426.19, 426.22
See application file for complete search history.

(56) References Cited

U.S. PATENT DOCUMENTS

| | | |
|---|---|---|
| 7,319,908 B2 | 1/2008 | Sinclair et al. |
| 7,467,353 B2 | 12/2008 | Kurlander et al. |

(Continued)

OTHER PUBLICATIONS

International Search Report and Written Opinion—PCT/US2013/026324—ISA/EPO—Sep. 4, 2013.

(Continued)

*Primary Examiner* — Cong Tran
(74) *Attorney, Agent, or Firm* — Toler Law Group, PC

(57) ABSTRACT

A method for controlling an application in a mobile device is disclosed. The method includes receiving environmental information, inferring an environmental context from the environmental information, and controlling activation of the application based on a set of reference models associated with the inferred environmental context. In addition, the method may include receiving a sound input, extracting a sound feature from the sound input, transmitting the sound feature to a server configured to group a plurality of mobile devices into at least one similar context group, and receiving, from the server, information on a leader device or a non-leader device and the at least one similar context group.

53 Claims, 15 Drawing Sheets

(51) Int. Cl.
*G06F 1/32* (2006.01)
*H02J 9/00* (2006.01)

(56) References Cited

U.S. PATENT DOCUMENTS

| | | | |
|---|---|---|---|
| 7,973,857 | B2 | 7/2011 | Ahmaniemi et al. |
| 8,862,715 | B1* | 10/2014 | Tom et al. .................... 709/223 |
| 2002/0072982 | A1 | 6/2002 | Barton et al. |
| 2006/0167647 | A1 | 7/2006 | Krumm et al. |
| 2008/0010560 | A1* | 1/2008 | Morimoto ....................... 714/47 |
| 2008/0140338 | A1 | 6/2008 | No et al. |
| 2008/0160976 | A1 | 7/2008 | Virolainen et al. |
| 2008/0164997 | A1* | 7/2008 | Aritsuka et al. ......... 340/539.13 |
| 2011/0177797 | A1* | 7/2011 | Vendrow et al. ............ 455/414.1 |
| 2011/0310125 | A1* | 12/2011 | McEldowney et al. ....... 345/660 |
| 2012/0191966 | A1* | 7/2012 | Jovicic et al. ................ 713/100 |
| 2012/0329447 | A1* | 12/2012 | Gilbert et al. ................. 455/420 |
| 2013/0024778 | A1* | 1/2013 | Reeves et al. ................. 715/744 |
| 2013/0083944 | A1* | 4/2013 | Kvist et al. ...................... 381/92 |
| 2013/0122935 | A1* | 5/2013 | Das et al. .................... 455/456.3 |
| 2013/0208903 | A1* | 8/2013 | Ojala ............................... 381/23 |
| 2013/0217420 | A1* | 8/2013 | Aoike, Toru ............... 455/456.3 |
| 2013/0226593 | A1* | 8/2013 | Magnusson et al. .......... 704/276 |

OTHER PUBLICATIONS

Wu, Chao-Lin et al., "An adaptive duty-cycle scheme for GPS scheduling in mobile location sensing applications", Second International Workshop on Sensing Applications on Mobile Phones at ACM SenSys, Nov. 1, 2011, XP055076281, Retrieved from the Internet: URL:http://131.107.65.14/en-us/um/redmond/events/phonesense2011/papers/AnAdaptive.pdf [retrieved on Aug. 23, 2013].

\* cited by examiner

CONTROLLING APPLICATIONS IN A MOBILE DEVICE BASED ON ENVIRONMENTAL CONTEXT

CROSS-REFERENCE TO RELATED APPLICATIONS

This application claims priority under the benefit of 35 U.S.C. §119(e) to Provisional Patent Application No. 61/613,457, filed Mar. 20, 2012. This provisional patent application is hereby expressly incorporated by reference herein in its entirety.

TECHNICAL FIELD

The present disclosure relates generally to controlling applications in a mobile device. More specifically, the present disclosure relates to controlling applications in a mobile device based on an environmental context of the mobile device.

BACKGROUND

There currently exists a variety of portable computing devices (i.e., mobile devices), including wireless computing devices such as mobile telephones, personal digital assistants (PDAs), tablet computers, and laptop computers, which are small, lightweight, and easily carried by users. Mobile devices such as cellular telephones, internet protocol (IP) telephones, and smartphone devices can communicate audio and data packets over wireless networks. In addition, mobile devices may also process software applications such as a web browser application, a music player, an email program, a game, etc.

Further, many such mobile devices may include one or more microphones that are used to capture audio signals. With wireless capabilities, the transmission of audio information, such as speech and music, on mobile devices by digital techniques has become widespread. Audio signals can also be processed for audio recognition, which is used for many applications such as searching for music in a mobile device.

Such applications, however, are typically configured to run continuously on the mobile device, such as for automatically capturing environmental sounds of the mobile device. Since the applications are running continuously, the mobile device may consume a large amount of power, thereby limiting the battery life of the mobile device. In addition, the applications may communicate audio information over a network continuously, further depleting the power resources of the mobile device. Thus, there is a need for a method and apparatus for controlling applications in a mobile device to improve the use of power resources.

SUMMARY

The present disclosure provides methods, systems and devices for controlling an application in a mobile device.

According to one aspect of the present disclosure, a method for controlling an application in a mobile device is disclosed. The method includes receiving environmental information indicating at least one environmental condition, inferring an environmental context of the mobile device from the environmental information, and controlling activation and/or other features of the application based on a set of reference models associated with the inferred environmental context.

In addition, the method may include receiving a sound input captured from an environmental sound, extracting a sound feature from the sound input, transmitting the sound feature to a server configured to group a plurality of mobile devices into at least one similar context group based on a similarity of the sound features from the plurality of mobile devices and identify a leader device or a non-leader device in the at least one similar context group, and receiving, from the server, information on the leader device or the non-leader device and the at least one similar context group. The server may receive the sound feature from the leader device in the at least one similar context group. Further, transmitting the sound feature may include transmitting a new sound feature to the server when a different environmental context is inferred in the mobile device. This disclosure also describes a device, a system, a server, a combination of means, and a computer-readable medium relating to this method.

According to another aspect of the present disclosure, a mobile device may include a receiver configured to receive environmental information indicating at least one environmental condition, a context inference unit configured to infer an environmental context of the mobile device from the environmental information, and an application control unit configured to control activation of the application based on a set of reference models associated with the inferred environmental context.

Further, the mobile device may include a sound sensor configured to receive a sound input captured from an environmental sound, a sound feature extractor configured to extract a sound feature from the sound input, a transmitter configured to transmit the sound feature to a server configured to group a plurality of mobile devices into at least one similar context group based on a similarity of the sound features from the plurality of mobile devices and identify a leader device or a non-leader device in the at least one similar context group, and a group information receiver configured to receive, from the server, information on the leader device or the non-leader device and the at least one similar context group. The leader device in the at least one similar context group may transmit the sound feature to the server. Further, the transmitter may be configured to transmit a new sound feature to the server when the context inference unit infers a different environmental context.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as to not unnecessarily obscure aspects of the various embodiments.

At a mobile device, environmental information is received that indicates an environmental condition. The mobile device infers its environmental context from the environmental information, and controls activation and other features of an application based on a set of reference models associated with the inferred environmental context. These other features include adjusting duty cycles, controlling targets and network resources, and adjusting the allowable latency of the application. "Environmental context inference" refers to an act or process of deriving conclusions that the user is enrolled in a certain environment, based on environmental information indicating at least one environmental condition such as location, light intensity, motion, time, etc.

Figure 1:
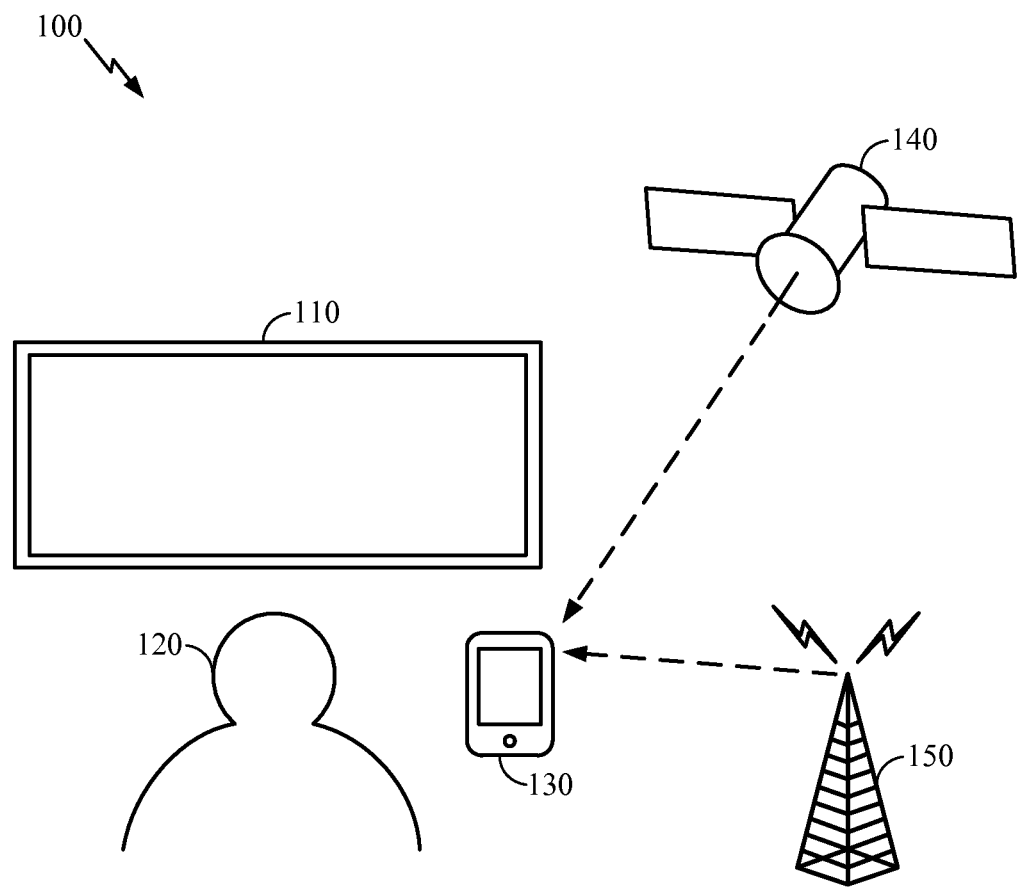
FIG. 1 illustrates controlling an application in a mobile device based on location information of the mobile device, according to some embodiments.

FIG. 1 illustrates a scenario 100 where an application is controlled in a mobile device 130 based on location information of the mobile device, according to some embodiments. As used herein, "location information" refers to any information or any type of data indicating where the mobile device is located, such as latitude, longitude, altitude, information of a nearby building, a regional name, etc. In addition, "controlling application" refers to any operation to activate, inactivate, or execute an application. Further, an "application" refers to any methods or functions to perform a specific task, such as software, firmware, functionalities, and services processed by a processing chip or DSP (digital signal processor).

For example, the mobile device 130 may infer its environmental context such as a movie theatre based on the location information, and activate (or adjust the features, settings, and/or algorithms of) a movie theatre application based on the environmental context inference. In this manner, the movie theatre application can be activated only when necessary, and the mobile device 130 can reduce the power required to operate the application, because environmental context inference of the mobile device 130 may use much less power than operating the application.

More particularly, a user 120 watching a movie on a movie screen 110 or other display typically has in their possession a mobile device 130, such as a smartphone and tablet computer, when they go to see the movie. Some of the users watching the movie may forget to turn off their mobile devices while the movie is playing, to the annoyance of others. In this case, when a message such as "please turn off your phone" is announced in a theatre, a movie theatre application running in the mobile device 130 may recognize such message to turn off the mobile device.

Specifically, the mobile device 130 may receive the announcement "please turn off your phone" to generate an audio fingerprint of the announcement. As used herein, "audio fingerprint" refers to any information or data uniquely describing or representing a sound and includes a sound feature or any other sound identifier. After the mobile device 130 generates such an audio fingerprint, the generated audio fingerprint is compared with a reference audio fingerprint (i.e., "sound identification") that is pre-generated from the reference announcement "please turn off your phone" and pre-stored in a server or the mobile device 130. If it is determined that the generated audio fingerprint matches the reference audio fingerprint, the movie theatre application may turn off the mobile device 130.

In some embodiments, the movie theatre application may always be activated to capture the announcement "please turn off your phone." However, in this case, the application will be activated although the user 120 is not located in a movie theatre, and will waste power operating the application. Thus, to save power consumption in the mobile device 130, the movie theatre application may be activated only when the user 120 of the mobile device 130 is located in a movie theatre.

For identifying whether the mobile device 130 is located in a movie theatre, the mobile device 130 may receive location information from a GPS (global positioning system) satellite 140 or a base station 150. Specifically, the mobile device 130 may calculate a position of the mobile device 130 based on signals from GPS satellites 140 high above the Earth. If the mobile device 130 cannot receive a signal from the GPS satellites 140 due to an obstacle between the mobile device 130 and the GPS satellites 140, the mobile device 130 may receive location information from a nearby base station 150. In addition, the mobile device 130 may coordinate the location information from the GPS satellite 140 and the base station 150. After receiving the location information, the mobile device 130 may determine whether the mobile device 130 is located in a movie theatre based on the location information. If the mobile device 130 determines that the mobile device 130 is located in a movie theatre, the mobile device 130 may activate the movie theatre application to capture sounds emanating from the movie theatre.

In the above embodiments, the mobile device 130 infers an environmental context of the mobile device 130 such as a movie theatre based on the location information, and activates the movie theatre application based on the environmental context inference. In this manner, the movie theatre application can be activated only in the case of necessity, and the mobile device 130 can reduce a power required to operate the application, since environmental context inference of the mobile device may use much less power than operating the application. Thus, in some embodiments, only the operation for context inference can always be activated on the mobile device 130 instead of operating the application, since the operation for context inference may be implemented using lower power as compared to operating the application.

Figure 2:
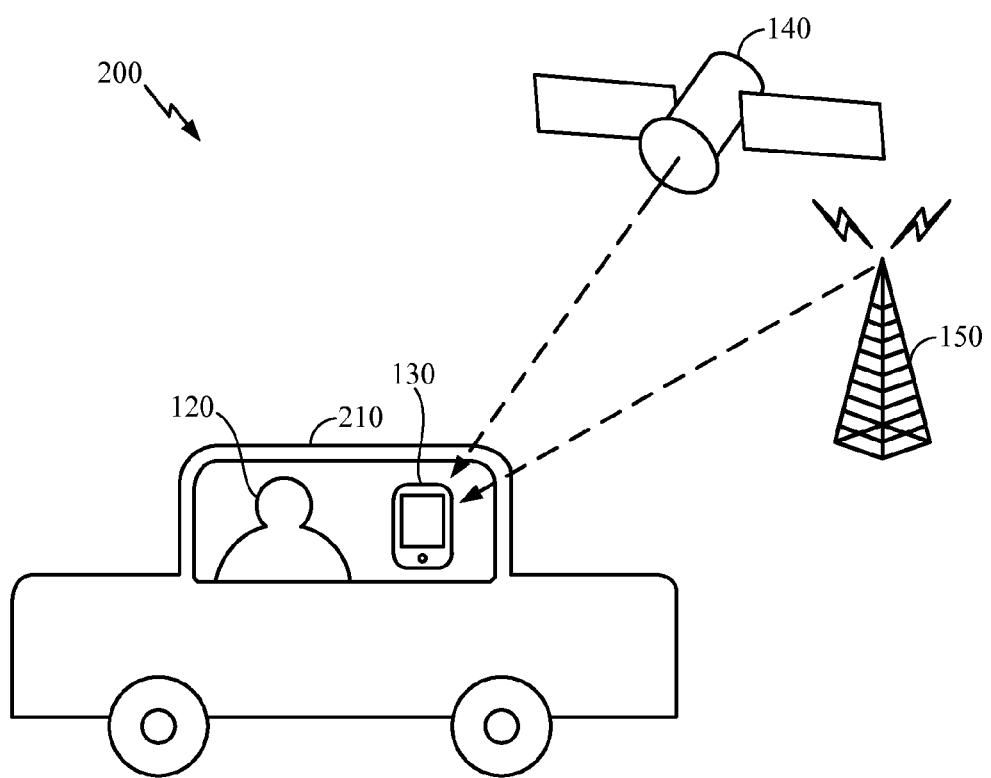
FIG. 2 illustrates controlling an application in a mobile device when the mobile device is in a car, according to some embodiments.

As another example, a user (e.g., a driver) may have a mobile device and listen to a radio in a car or other vehicle. FIG. 2 illustrates another scenario 200 where an application is controlled in a mobile device 130 when the mobile device 130 is in a car 210 (or other vehicle), according to some embodiments. A user 120 (e.g., a driver) may have a mobile device 130 and listen to a radio in a car 210. The mobile device 130 may receive location information from GPS satellites 140 and/or a base station 150.

In the embodiments, the mobile device 130 may infer that the user 120 of the mobile device 130 is in the car 210 when the location of the mobile device 130 is changed at a high speed or when the mobile device 130 is located on a road. In this case, the mobile device 130 may activate a music search application to perform a search based on music from the radio. Further, based on the environmental context inference above, the mobile device 130 may inactivate a movie theatre application if the movie theatre application is activated.

Figure 3:
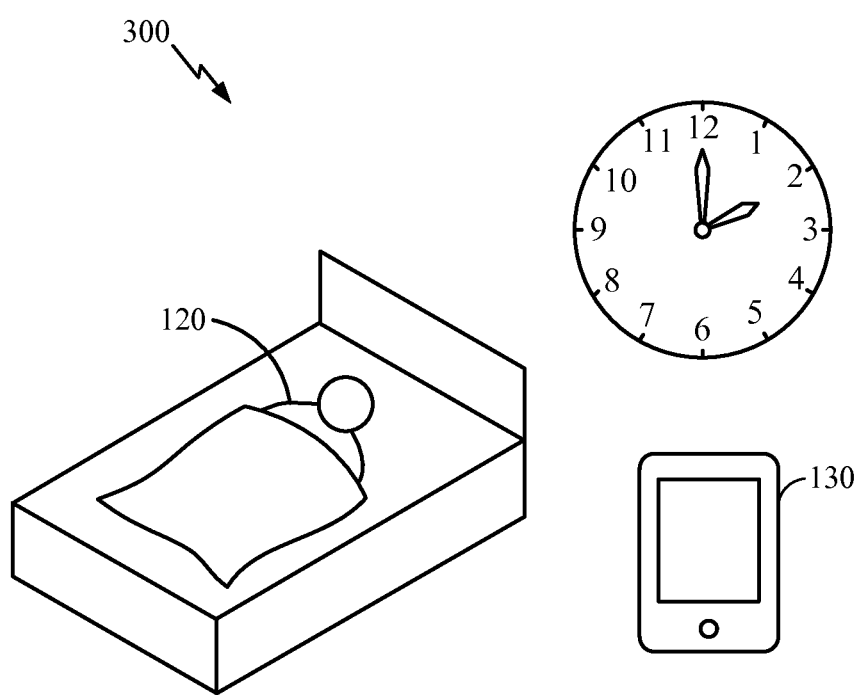
FIG. 3 illustrates controlling an application in a mobile device based on current time information, according to some embodiments.

FIG. 3 illustrates yet another scenario 300 where an application is controlled in a mobile device 130 based on current time information, according to some embodiments. A user 120 may put a mobile device 130 near a bed when he sleeps. In this case, the mobile device 130 may receive time information and infer that the user 120 is sleeping if the time is between 12 am and 7 am, for example. The mobile device 130 may then inactivate (or otherwise adjust the features, settings, and/or algorithms of) all applications (e.g., the movie theatre application and the music search application) to reduce the usage of operation power and network resources. In the embodiments, the mobile device 130 may use a light sensor or a proximity sensor to determine whether the user 120 is sleeping.

It should be appreciated that the above scenarios 100, 200, and 300 are described for the purpose of providing examples of controlling applications in the mobile device 130, e.g., activating a movie theatre application when the mobile device 130 is located in a movie theatre, activating a music search application when the mobile device 130 is located in a car 210, and inactivating all applications when the user 120 is sleeping. Many other applications are possible. In some embodiments, the user 120 may preset conditions when applications are activated or inactivated. For example, the user 120 may preset activating a movie theatre application when the mobile device 130 is located in a movie theatre, a motion sensor does not detect a motion, and a light sensor does not detect light.

In an implementation, an always running application is equipped with an optimized set of resources (e.g., network usage, codec duty, a set of reference models, etc.) based on its environmental context. This allows for a low-power operation. Thus, an always-running application is controlled by its environmental context. For example, an application is always running. In an implementation, when the environmental setting is in a car, the application sets its reference models as a music database (either with or without network resource). Then, after a predetermined amount of time elapses, the application may infer that the mobile device is in a movie theatre. At that point, the application sets its resources for a movie theatre application.

In some implementations, duty cycle refers to the duty cycle of the audio codec that is used to monitor the input sound (e.g., the duty cycle of devices relevant to the sound capture feature, such as the codec). Monitoring the input sound continuously may exhaust the power. To avoid it, the audio codec may operate in its duty-cycled mode. Assume a 10% duty-codec: in its off-duty status (which occupies 90% of time), the audio codec may be idle and perform no functions, thus consumes minimum power. In its on-duty state, the audio codec may analyze the input sound and activate sound inference applications if the input sound can be an interesting sound (such as music/speech). By this, the power may be reduced by 1/10, for example. Power may be saved by configuring the 'on/off duty ratio' depending on the environmental condition. For applications requiring prompt response, this may be 1/10, for example, although other values may be used depending on the implementation. For applications allowing a generous response time, this may be 1/100, for example.

Alternatively or additionally, in some implementations, duty cycle may refer to the duty cycle of a high level application (e.g., an application used to infer an environmental context).

In an implementation, two types of duty cycles may be used: one for capturing environmental information and the other for inferring an environmental context. Based on the inferred environmental context and allowable latency, the mobile device 130 may control these two duty cycles for power reduction.

Figure 4:
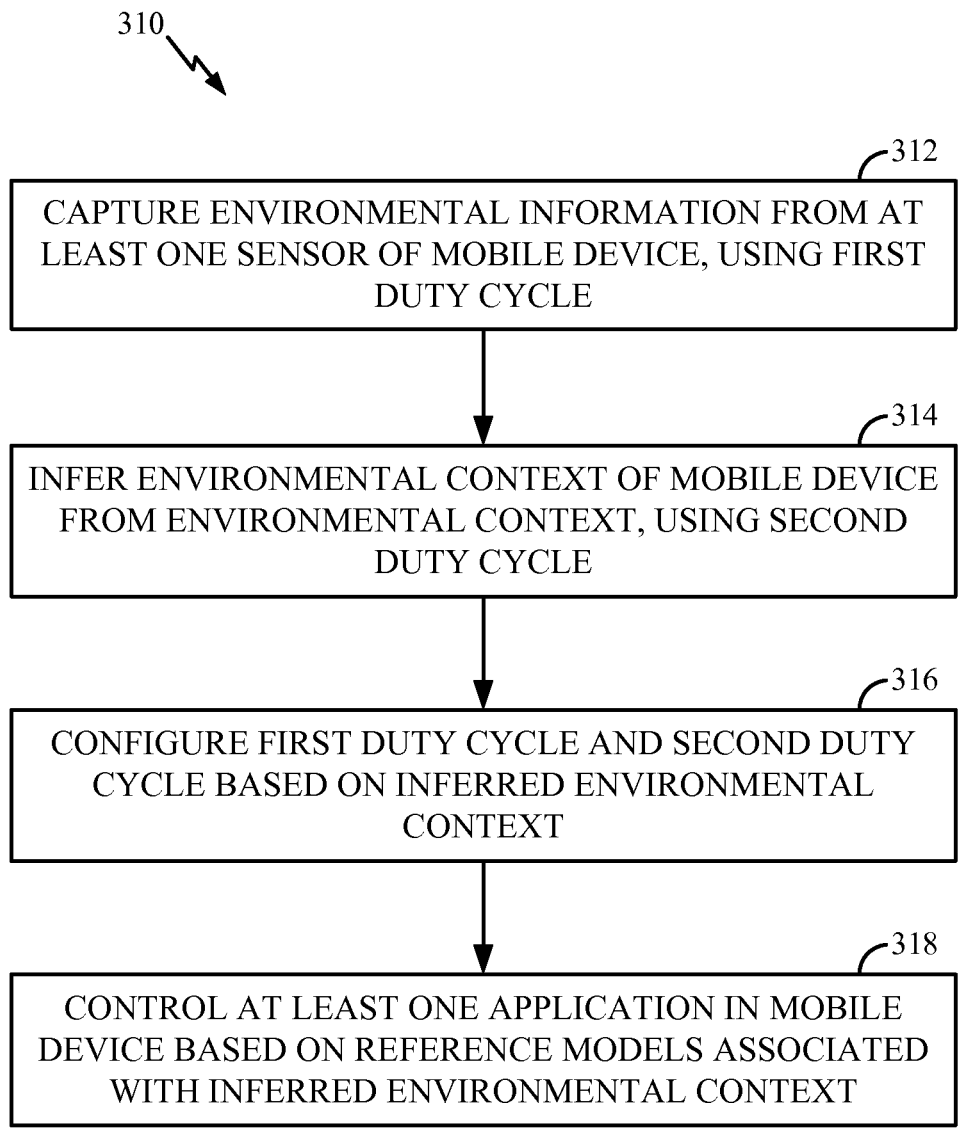
FIG. 4 illustrates a flowchart of a method for controlling at least one application in a mobile device, according to some embodiments.

FIG. 4 illustrates a flowchart of a method 310 for controlling at least one application in a mobile device, according to some embodiments. At 312, environmental information is captured from at least one sensor of the mobile device using a first duty cycle. At 314, an environmental context of the mobile device is inferred from the environmental information using a second duty cycle.

At 316, the first duty cycle and the second duty cycle are configured based on the inferred environmental context. At 318, at least one application in the mobile device is controlled based on a set of reference models associated with the inferred environmental context. Thus, the operating mode for an application, like a sound inference application, network usage, codec duty cycle, etc., may be adjusted or controlled (e.g., made active, made idle, made active with a reduced or limited feature set, etc.). This can save power and reduce network usage, for example. In some implementations, the first duty cycle and/or the second duty cycle may be controlled using the inferred environmental context and an allowable latency of the at least one application.

Figure 5:
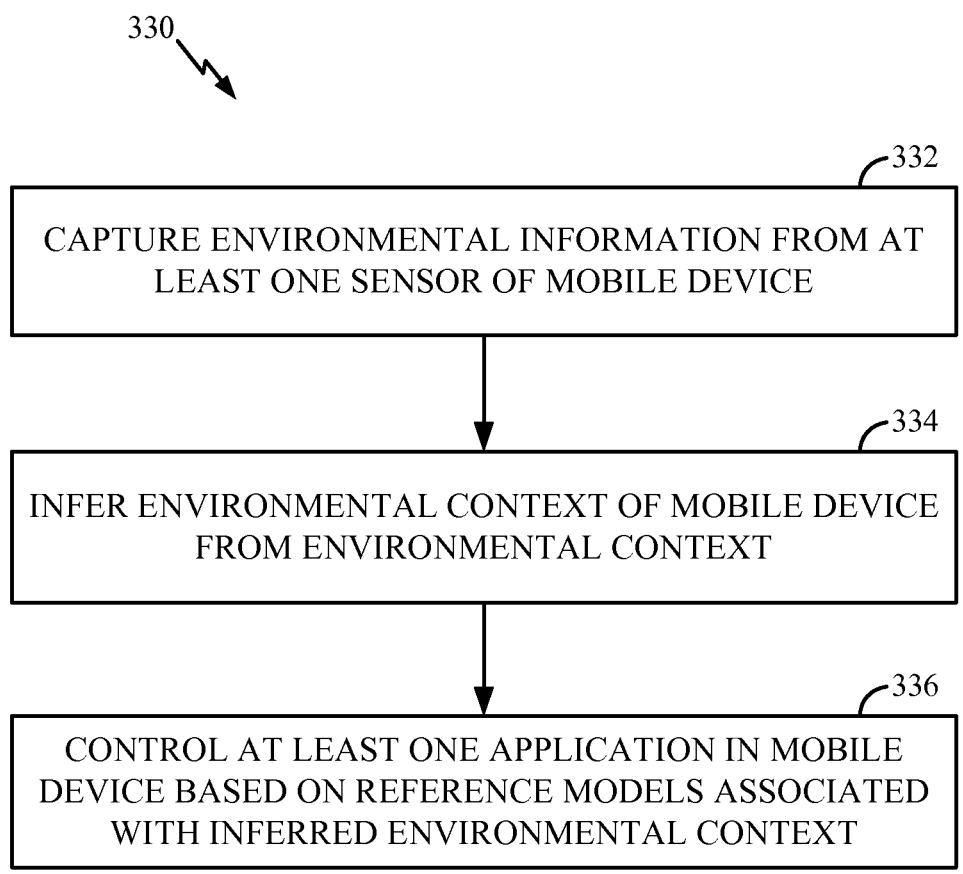
FIG. 5 illustrates a flowchart of another method for controlling at least one application in a mobile device, according to some embodiments.

FIG. 5 illustrates a flowchart of another method 330 for controlling at least one application in a mobile device, according to some embodiments. At 332, environmental information is captured from at least one sensor of the mobile device. At 334, an environmental context of the mobile device is inferred from the environmental information. At 336, at least one application in the mobile device is controlled based on a set of reference models associated with the inferred environmental context. Depending on the implementation, controlling may comprise setting a duty cycle and/or setting an allowable latency of the application. Thus, controlling a duty cycle or a latency of the application in the mobile device may be based on the inferred environmental context.

In some embodiments, the mobile device 130 may include an application configured to switch its operation mode into one of multiple active modes associated with a plurality of databases, based on environmental context inference. For example, the application may be configured to switch its operation mode to one of the active modes associated with a movie theatre database which includes reference sounds extracted from a movie theatre, a music database which includes reference music, and an announcement database which includes reference announcement sounds on public transportation, such as a bus or a train. The application may also be configured to switch its operation mode to an idle mode where the environmental context inference indicates that the mobile device 130 is not located in any one of targeted environments. In these embodiments, if the mobile device 130 infers that it is located in any one of the targeted environments, the operation mode of the application is changed from the idle mode to the active mode.

After the application is activated, the application determines a database from the plurality of databases based on the environmental context inference. For example, if the mobile device 130 infers that the mobile device 130 is located in a movie theatre, the application may select the movie theatre database for sound identification (i.e., determining whether the announcement "please turn off the phone" is emanated from the movie theatre). Further, if the mobile device 130 infers that the mobile device 130 is located in a car, the application may select the music database for sound identification (i.e., searching the name of the music). After finishing the sound identification, the operation mode of the application may be changed back to the idle mode for saving power consumption.

Figure 6:
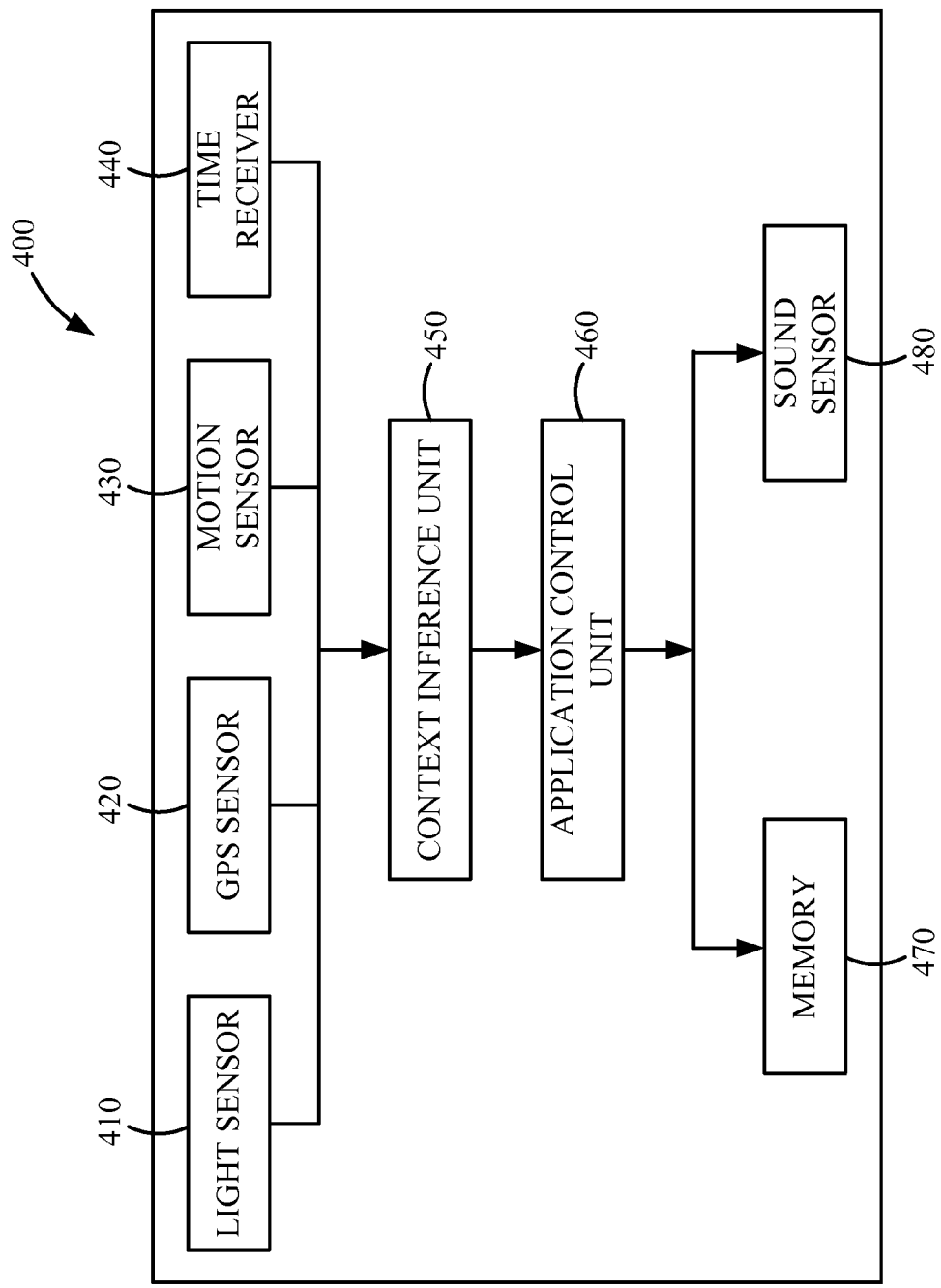
FIG. 6 illustrates a block diagram of a mobile device for controlling applications by inferring an environmental context based on light intensity, location information, motion information, and time information, according to some embodiments.

FIG. 6 illustrates a block diagram of a mobile device 400 for controlling applications by inferring an environmental context based on light intensity, location information, motion information, and time information. The mobile device 400 may include a light sensor 410 to detect light intensity, a GPS sensor 420 to receive a signal from GPS satellites, a motion sensor 430 to detect a motion of the mobile device 400, and a time receiver 440 to receive time information from the GPS satellites, a base station, or the mobile device 400 itself. Information from each sensor may be used as the environmental information of the mobile device 400.

After receiving the environmental information, a context inference unit 450 may infer an environmental context of the mobile device 400. For example, if location information of the GPS sensor 420 indicates a movie theatre, the mobile device 400 infers that the user 120 is in a movie theatre and watching a movie. Alternately, if the speed of movement of the mobile device 400 is greater than a predetermined value, the mobile device 400 infers that the user is in a car.

After inferring an environmental context of the mobile device 400 at the context inference unit 450, an application control unit 460 may control the application based on the inferred environmental context. For example, if the inferred environmental context is a movie theatre, the mobile device 400 may determine a set of reference sound models (i.e., database) which is associated with the inferred theatre context and include a reference sound model of a reference announcement, "please turn off your phone." Then, the mobile device 400 may activate or adjust a movie theatre application that is authorized to use the database. The movie theatre application may be stored in a memory 470. Further, the database may be included in the mobile device 400 or a server.

The activated movie theatre application may capture a sound (or audio signal) from an environmental sound by using a sound sensor 480. The captured sound is processed to extract an audio fingerprint ("audio fingerprint" refers to any information or data uniquely describing or representing a sound and includes a sound feature or any other sound identifier). Then, the extracted audio fingerprint is compared with the set of reference sound models (i.e., reference audio fingerprints), and similarity values between the audio fingerprints are determined using any known similarity determining or measuring technique(s). After determining the similarity values, a reference audio fingerprint having the greatest similarity value or being the best match to the extracted audio fingerprint is identified from the set of reference audio fingerprints. In these embodiments, an audio fingerprint extracted from the announcement "please turn off your phone" will match a reference audio fingerprint extracted from the same announcement. After determining a reference audio fingerprint, a function associated with the identified reference audio fingerprint is determined. For example, the reference audio fingerprint extracted from the reference announcement "please turn off your phone" may be associated with a function for turning off, or otherwise adjusting other settings or functionalities of, the mobile device 400. Then, the function is executed on the mobile device 400.

In some embodiments, the set of reference sound models may be included in a server. In this case, the mobile device 400 may transmit the extracted audio fingerprint to the server. Then, the server may compare the extracted audio fingerprint with the reference sound models, and determine a function to be executed on the mobile device 400 based on the comparison result. After determining the function, the server may transmit information on the determined function to the mobile device 400.

As described above, the application may be configured to receive a sound input, extract an audio fingerprint from the sound input, send the fingerprint to a server, compare the audio fingerprint with reference audio fingerprints, and determine an action (or function) to be executed on the mobile device 400 to minimize the use of operation energy and network resources. Therefore, in the above embodiments, the application is activated or settings adjusted only when the application needs to be activated, or have its settings adjusted, by inferring the context at the context inference unit 450.

It should be appreciated that the mobile device 400 includes all the components necessary for receiving an audio signal, digitally processing the audio signal to compute an audio fingerprint, determining an associated action, and executing the associated action. In other embodiments, one or more of the components of the mobile device 400 may be operable from a remote location, e.g., a server device.

Figure 7:
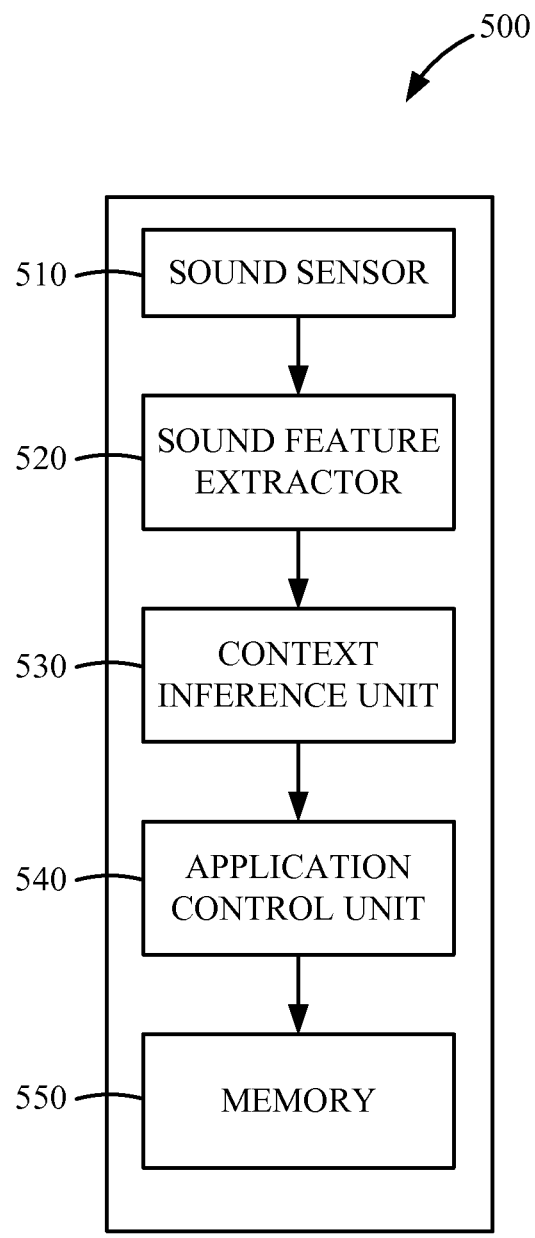
FIG. 7 illustrates a block diagram of a mobile device for controlling applications by inferring an environmental context based on environmental sound, according to some embodiments.

FIG. 7 illustrates a block diagram of a mobile device 500 for controlling applications by inferring an environmental context based on an environmental sound, according to some embodiments. In these embodiments, the mobile device 500 may receive sound input from an environmental sound to infer an environmental context of the mobile device 500. Specifically, the mobile device 500 may receive a sound input from an environmental sound at a sound sensor 510 and extract sound features (e.g., frequency domain spectrum or power spectrum) from the received sound input at a sound feature extractor 520. The sound features may be extracted by using any suitable signal processing methods. For example, such methods may include spectrum analysis, MFCC (Mel-frequency cepstral coefficients), LPC (linear predictive coding), and/or LSP (line spectral pair) techniques, which are well-known techniques.

Based on the extracted sound features, a context inference unit 530 may infer an environmental context of the mobile device 500. For example, in some embodiments, the mobile device 500 may receive a sound input from the environmental sound, and extract a power spectrum of the sound input. If the power of the sound input is greater than a predetermined threshold, the mobile device 500 may infer that the mobile device 500 is in a sounding environment, which refers to the place where the sound (e.g., music or announcement) is coming from.

In some embodiments, the mobile device 500 may determine whether the sound input is a sound from a speaker. In this case, the mobile device 500 may include a database having reference sound features which are extracted from reference sounds that may be emanated from a speaker (e.g., music on a CD). Specifically, the mobile device 500 may receive a sound input from the environmental sound, and extract sound features from the received sound input. Then, the mobile device 500 calculates a similarity value between the extracted sound features and the reference sound features. If the similarity value is greater than a predetermined threshold, the mobile device 500 may infer that the received sound from the mobile device 500 is emanated from a speaker (e.g., announcement from a speaker).

In some embodiments, the mobile device 500 may extract different types of sound features depending on the environmental context. For example, the mobile device 500 may determine whether the sound input is music or speech, and for each case, it extracts different types of sound features. Specifically, the mobile device 500 may receive a sound input from the environmental sound, and extract sound features (e.g., frequency-power domain spectrum) from the received sound input. If the power components in the frequency domain are concentrated between a 0~4 KHz frequency range for example, the mobile device 500 may infer that the sound is the voice of a human, and if the power components are concentrated between 0~8 KHz frequency range for example, the mobile device 500 may infer that the sound is music. In the case where the mobile device 500 infers that the sound is the voice of a human, the mobile device may transmit the sound features extracted from the frequency range between 0~4 KHz, instead of 0~8 KHz. Thus, the size of the extracted sound features can be reduced, and consequently the usage of network resources can be reduced.

After inferring an environmental context of the mobile device 500, an application control unit 540 may activate an application that is stored in a memory 550 based on the inferred environmental context. For example, if the mobile device 500 infers that the mobile device 500 is in a sounding environment, the application control unit 540 may activate a sound recording application stored in the memory 550.

Figure 8:
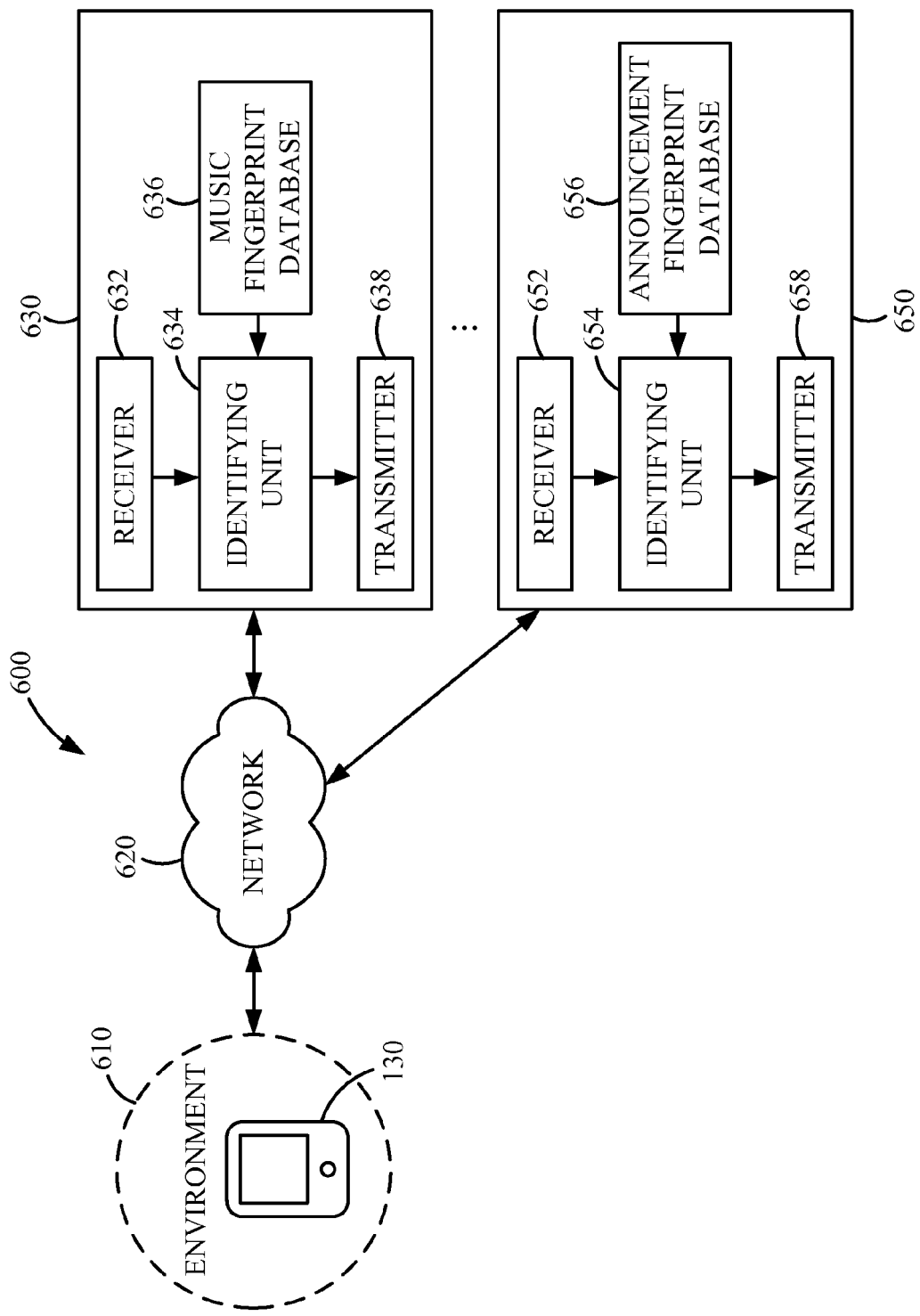
FIG. 8 illustrates an overview of a system for controlling an application in a mobile device by accessing a reference database in a server, according to some embodiments.

FIG. 8 illustrates an overview of a system 600 for controlling an application in a mobile device by accessing a reference database in a server, according to some embodiments. As described above, the mobile device 130 may infer an environmental context 610 of the mobile device 130 based on the environmental information. After inferring the environmental context 610, the mobile device 130 may activate an application related to the environmental context 610. For example, if the inferred environmental context 610 is music, the mobile device 130 may activate an application related to music, such as a music search application. The music search application may extract audio fingerprints from the received music, and transmit the extracted audio fingerprints to a music search server 630 that is associated with the music search application.

After transmitting the extracted audio fingerprints from the mobile device 130 to a receiver 632 of the music search server 630 via a network 620, an identifying unit 634 may compare the received audio fingerprints with reference music fingerprints of a music fingerprint database 636. By comparing the fingerprints, the identifying unit 634 may identify a best match reference music fingerprint. Then, the transmitter 638 may transmit a music name of the identified reference music fingerprint to the mobile device 130.

It should be appreciated that operations at an announcement server 650 are performed in the same manner as the music search server 630 if the mobile device infers that the environmental sound is an announcement, and thus, a description thereof is omitted for brevity. Similar to the music search server 630, the announcement server 650 comprises a receiver 652, an identifying unit 654, an announcement fingerprint database 656, and a transmitter 658. Further, in some other embodiments, the database 636 and 656 may be included in the mobile device 130.

In some embodiments, the mobile device 130 may transmit the extracted sound features to the servers 630 and 650 when the mobile device 130 is connected to the Internet or a base station. For example, the mobile device 130 may include a buffer, and store the extracted sound features in the buffer while the mobile device 130 is disconnected from the Internet. When the mobile device 130 is connected to the Internet, the mobile device 130 may transmit the stored sound features from the buffer to the servers 630 and 650.

Figure 9:
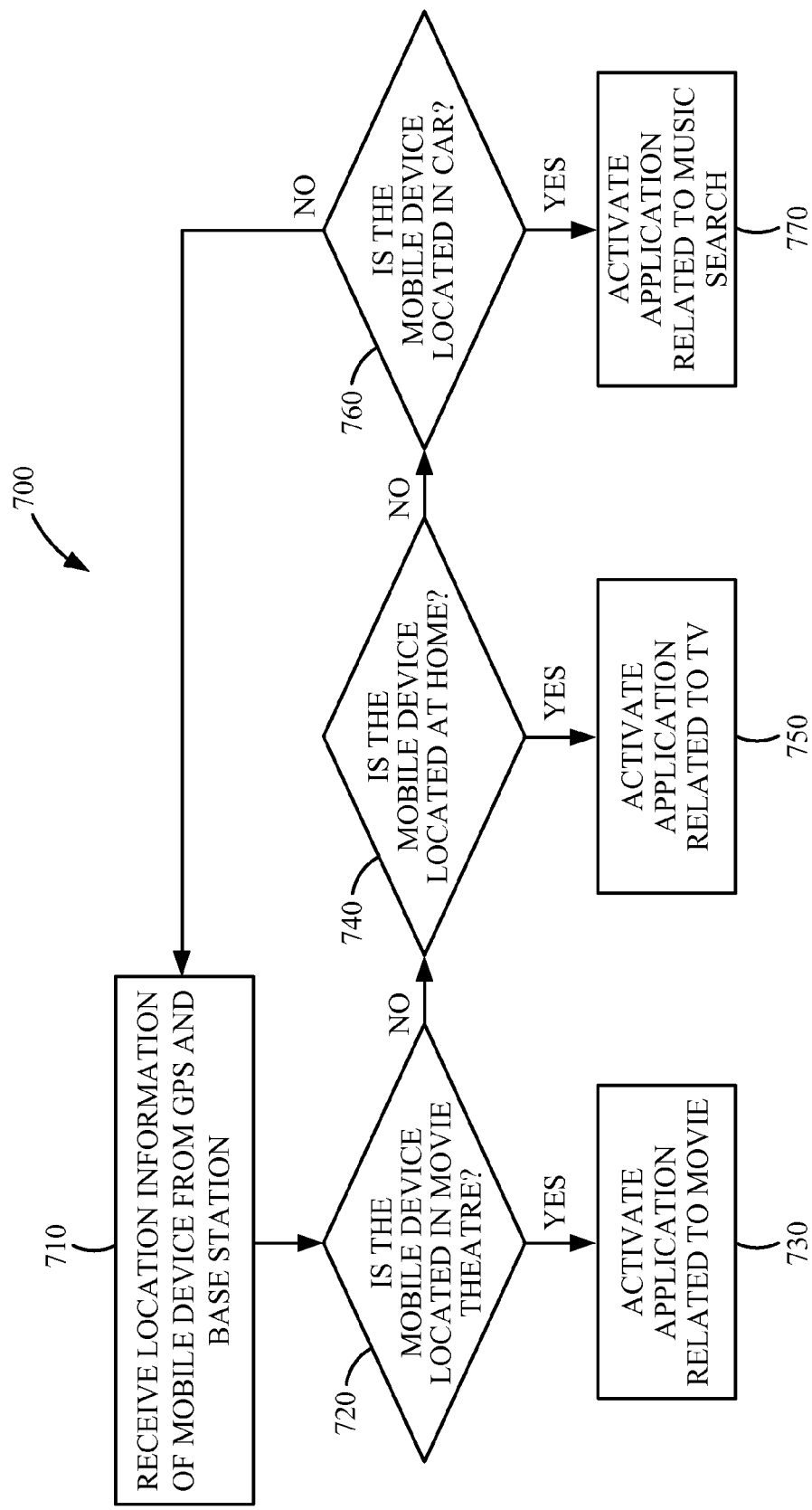
FIG. 9 illustrates a flowchart of a method for controlling an application based on location information of a mobile device, according to some embodiments.

FIG. 9 illustrates a flowchart of a method 700 for controlling an application based on location information of a mobile device. The mobile device receives location information of the mobile device from GPS satellites and a base station at 710. Then, the mobile device infers an environmental context of the mobile device based on the location information at 720, 740, and 760.

At 720, if the mobile device is located in a movie theatre, the mobile device activates an application related to movies (e.g., an application that turns off the phone when the mobile device captures the announcement "please turn off your phone") at 730.

At 740, if the mobile device is located at home, the mobile device activates an application related to the television (TV) (e.g., an application that automatically searches information of a product that is advertising on the TV) at 750. In an implementation, a TV channel application may try to find which channel is being broadcasted now, based on captured sound input.

At 760, if the mobile device is located in a car, the mobile device activates an application related to the car (e.g., an application that searches the name of a music playing on a radio) at 770.

In another implementation, multiple mobile devices may be grouped into a similar context group based on an inferred environmental context. In this system, an environmental sound is sensed and captured through a sound sensor in each of the mobile devices. A sound feature is then extracted from the captured environmental sound, and the extracted sound feature is transmitted to the server. Based on the transmitted sound feature, the server can group the mobile devices as being in a similar context group, because the sounds in the similar environment may be substantially identical, resulting in the extraction of substantially the same sound features. The list of the mobile devices in the similar context group is then transmitted to the mobile devices from the server, and used for providing a predetermined service in the mobile devices (e.g., chatting between the users of the grouped devices).

In an implementation, the server is used to group mobile devices based on their sound features. When grouped, some devices in a group are indicated as leader devices. Leader devices continuously send their sound feature to a server. Each non-leader device sends its sound feature to a server when that non-leader device's environmental context was changed. At a server, when a non-leader device's sound input is received, the server finds a leader whose sound feature has the maximum similarity to that of the non-leader device, and assigns that non-leader device to the group of the found leader device. In some implementations, alternatively or additionally, the leader may send its sound feature either continuously, duty-cycled, or when an environmental change occurs or exists.

In some implementations, after grouping the mobile devices, the server may identify a mobile device in the similar context group as a leader device or identify a mobile device in the similar context group as a non-leader device. Then, the server may transmit the information on the leader device or non-leader devices to the mobile devices in the similar context group. In this case, only the leader device may transmit a sound feature to the server while the non-leader devices may not transmit a sound feature to the server. Consequently, the usage of network resources to transmit the sound features can be reduced.

In some implementations, a new device may join the similar context group when a context of the new device is found to be similar to that of the similar context group. Specifically, the new device may transmit sound features extracted from an environmental sound to the server. Thereafter, the server identifies a similar context group by comparing the sound features transmitted from the new device and the sound features from the leader device. If the server determines that the sound features transmitted from the new device are similar to the sound features from the leader device, the server may add the new device to the similar context group.

In addition, the other mobile devices may transmit a sound feature to the server only when a different environmental context is inferred. For example, a mobile device may infer a different environmental context when the mobile device moves to another place, since the location information of the mobile device is changed. In this case, the mobile device may transmit a new sound feature extracted from the changed environmental sound. Then, the server may exclude that mobile device from the previous similar context group.

Figure 10:
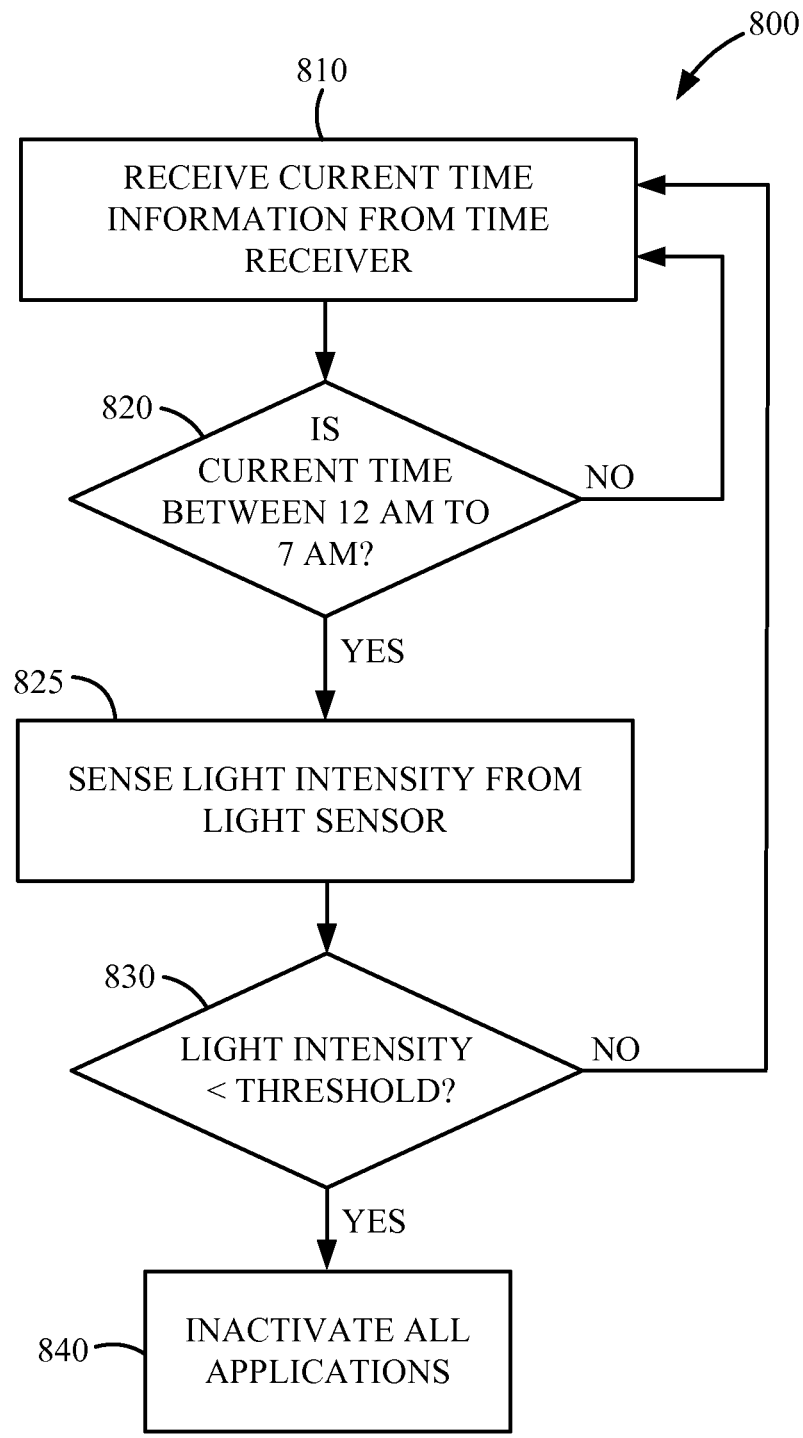
FIG. 10 illustrates a flowchart of a method for controlling an application based on time information and light intensity, according to some embodiments.

FIG. 10 illustrates a flowchart of a method 800 for controlling an application based on time information and light intensity, according to some embodiments. The mobile device infers an environmental context of the mobile device based on time information and light intensity information. Specifically, the mobile device receives current time information from a time receiver at 810. The time receiver may receive time information from GPS satellites, a base station, or a clock included in the mobile device. If the current time is between 12 am to 7 am (although any time(s) may be used depending on the implementation) at 820, the mobile device senses the light intensity from a light sensor at 825.

Then, if the output of the light sensor indicates that the light intensity is below a predetermined threshold at 830, the mobile device infers that the user of the mobile device is sleeping and inactivates all applications at 840. Alternately, the mobile device may inactivate all applications except a morning alarm application, for example, that is configured to wake the user up by using a noisy alarm in morning.

Figure 11:
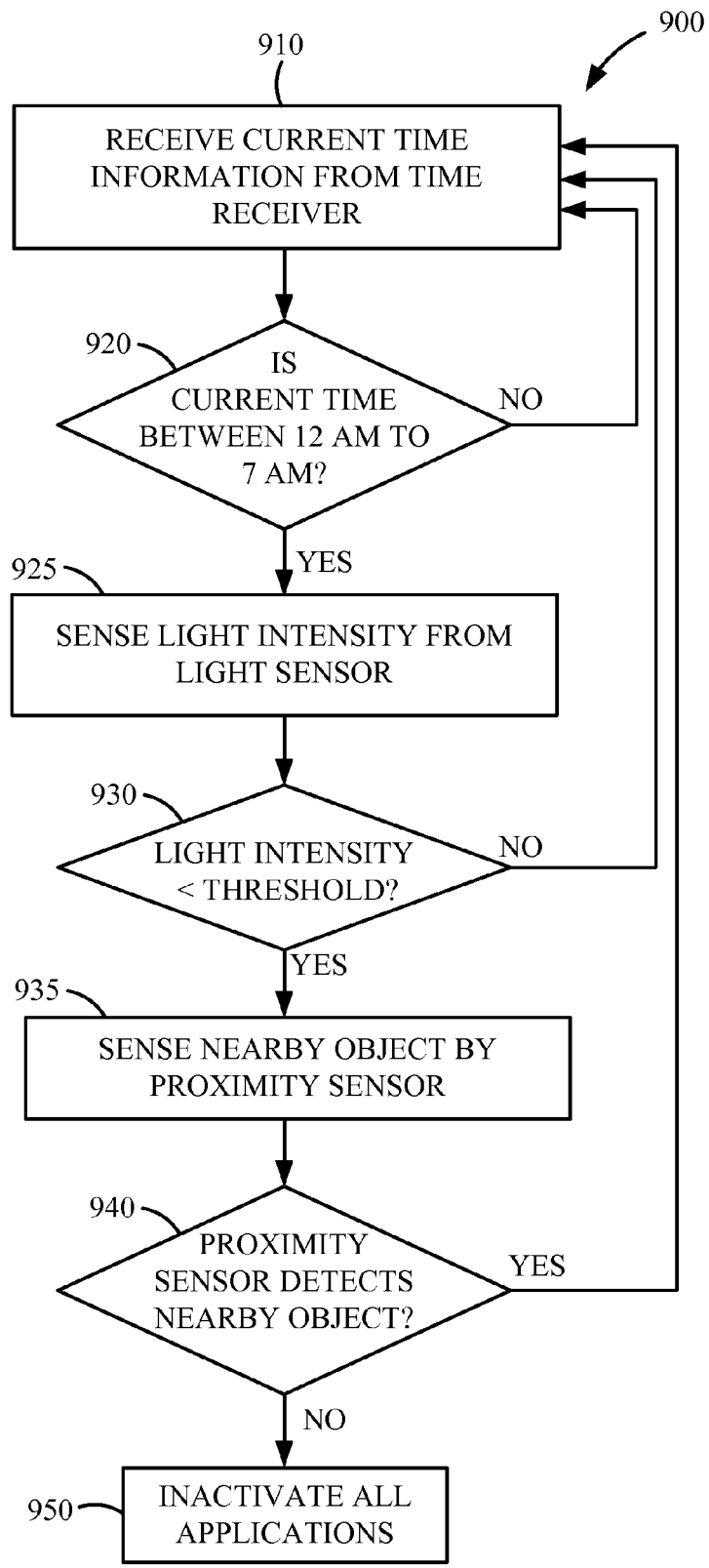
FIG. 11 illustrates a flowchart of a method for controlling an application based on time information, light intensity, and proximity of an object, according to some embodiments.

FIG. 11 illustrates a flowchart of a method 900 for controlling an application based on time information, light intensity, and proximity of an object, according to some embodiments. It should be appreciated that the operations at 910 to 930 and 950 of the method 900 are performed in the same manner as those at 810 to 830 and 840 of the method 800, and thus, a description thereof is omitted.

At 935, the mobile device senses a nearby object by using a proximity sensor. At 940, if the proximity sensor included in the mobile device detects a nearby object, the mobile device infers that the mobile device is in a pocket of the user or the user is using the mobile phone. In this case, the mobile device determines that the user is not sleeping. However, if the proximity sensor does not detect a nearby object at 940, the mobile device inactivates all applications at 950.

Figure 12:
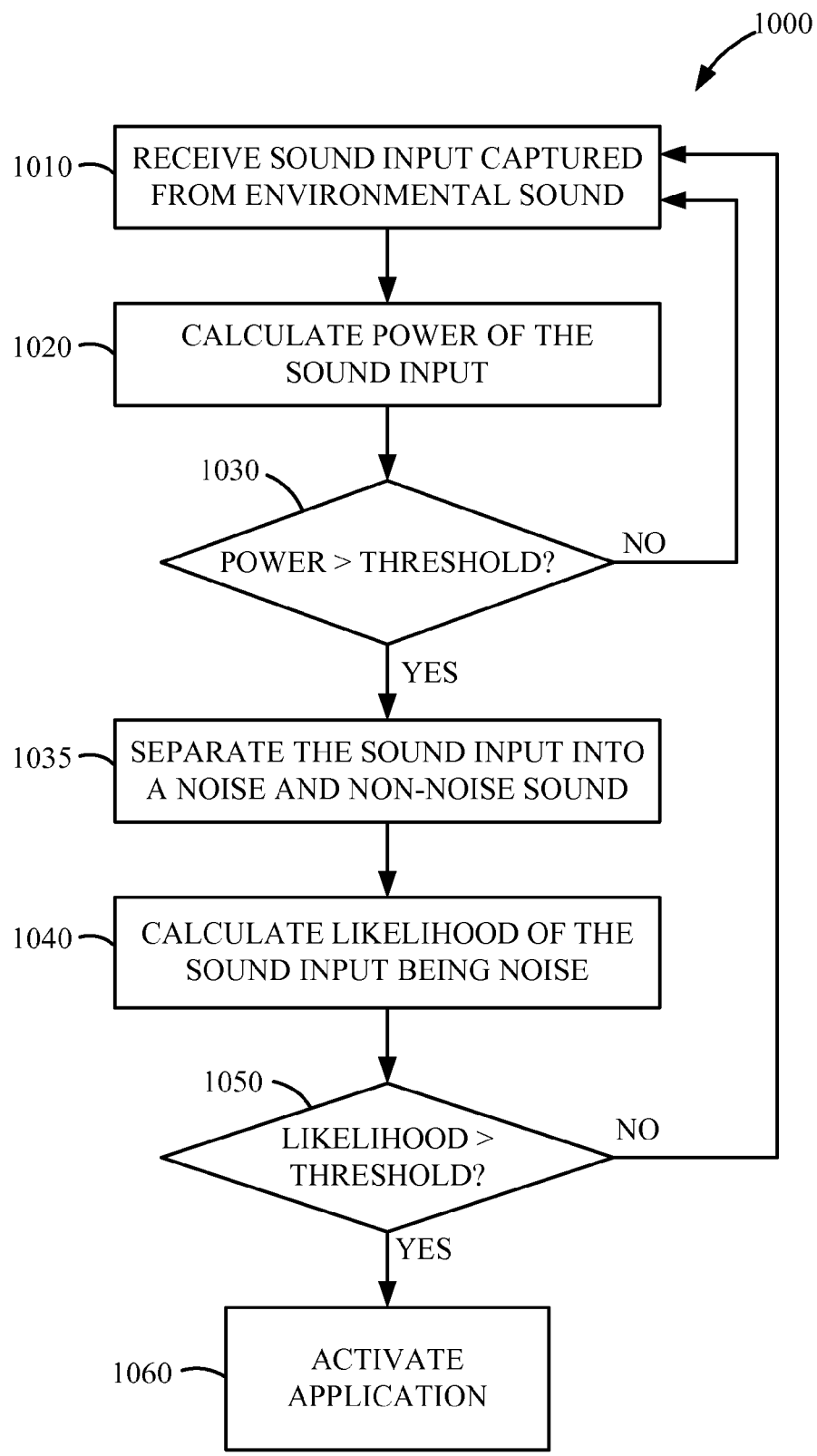
FIG. 12 illustrates a flowchart of a method for controlling an application based on an environmental sound, according to some embodiments.

FIG. 12 illustrates a flowchart of a method 1000 for controlling an application based on an environmental sound, according to some embodiments. The mobile device receives a sound input from an environmental sound at 1010. Then, the mobile device calculates the power (or level) of the received sound input to determine whether a sound exists at 1020.

At 1030, the mobile device determines if the power of the sound input exceeds a predetermined threshold. If the power of the sound input exceeds the threshold, the mobile device separates the sound input into a noise and non-noise sound at 1035.

After separating the received sound input, the mobile device calculates a likelihood of the sound input being a noise at 1040 to determine whether the sound input is a sound to be processed by the application or a noise to be ignored. The likelihood of the sound input being a noise may be calculated as follows:

$$L = \frac{P(O|\lambda_s)}{P(O|\lambda_n)} > \text{threshold}$$

where L indicates a likelihood of a sound input being a noise, $\lambda_s$ indicates a sound model of a non-noise sound, and $\lambda_n$ indicates a sound model of a noise. The sound models of the non-noise sound and noise may be generated by using well-known methods, such as Gaussian mixture modeling (GMM). At 1050, if the likelihood exceeds a predetermined threshold, the mobile device infers that the sound input is not a noise. Thus, the mobile device activates an application (e.g., an application that records an environmental sound) at 1060.

Figure 13:
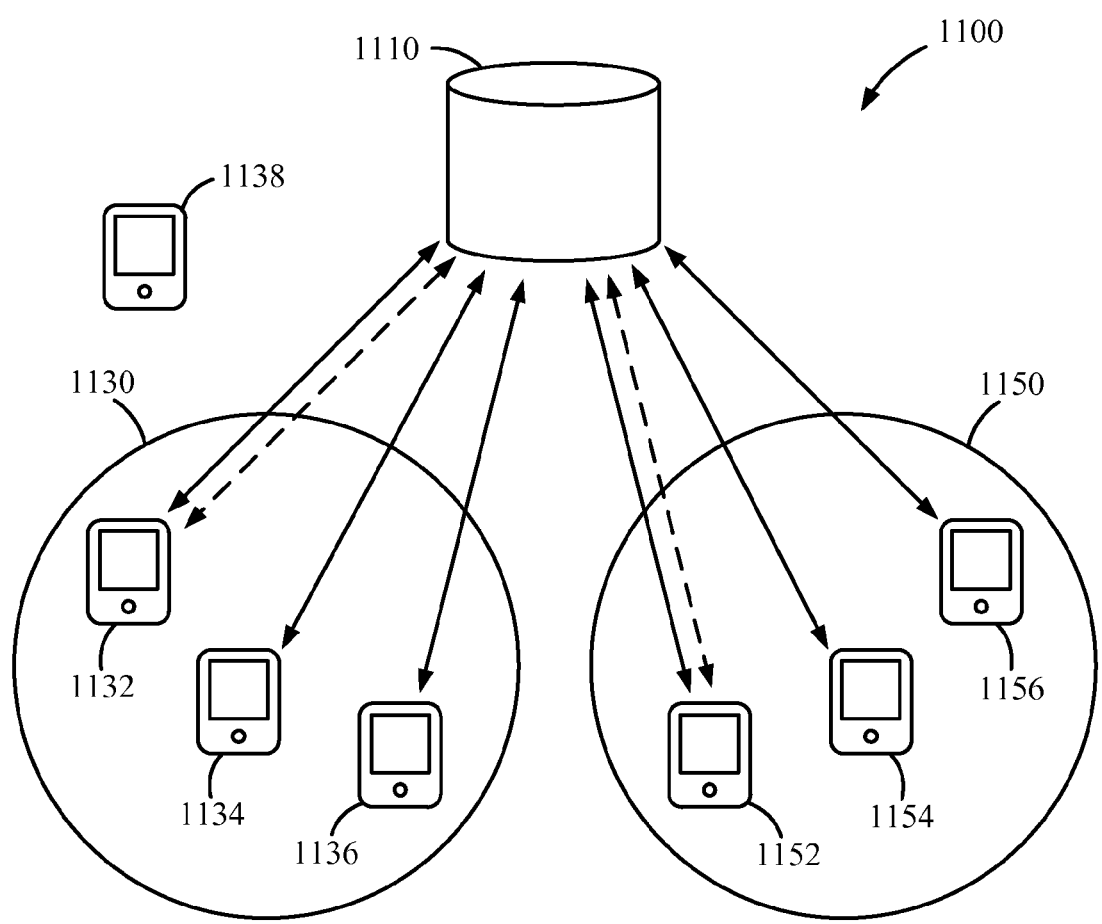
FIG. 13 illustrates an overview diagram of a system for grouping mobile devices into a similar context group based on an inferred environmental context, according to some embodiments.

FIG. 13 illustrates an overview diagram of a system 1100 for grouping mobile devices 1132, 1134, 1136, 1138, 1152, 1154, and 1156 into a similar context group 1130 and 1150 based on an inferred environmental context, according to some embodiments. In this system, an environmental sound is sensed and captured through a sound sensor in each of the mobile devices 1132, 1134, 1136, 1138, 1152, 1154, and 1156. A sound feature is then extracted from the captured environmental sound, and the extracted sound feature is transmitted to the server 1110.

Based on the transmitted sound feature, the server 1110 can group the mobile devices 1132, 1134, and 1136 as being in a similar context group 1130, because the sounds in the similar environment may be substantially identical, resulting in the extraction of substantially the same sound features. The list of the mobile devices in the similar context group 1130 is then transmitted to the mobile devices 1132, 1134, and 1136 from the server 1110, and used for providing a predetermined service in the mobile devices 1132, 1134, and 1136 (e.g., chatting between the users of the grouped devices).

In some embodiments, after grouping the mobile devices 1132, 1134, and 1136, the server 1110 may identify the mobile device 1132 in the similar context group 1130 as a leader device or identify the mobile device 1134 or 1136 in the similar context group as a non-leader device. Then, the server 1110 may transmit the information on the leader device 1132 or non-leader devices 1134 and 1136 to the mobile devices 1132, 1134, and 1136 in the similar context group 1130. In this case, only the leader device 1132 may transmit a sound feature to the server 1110 while the non-leader devices 1134 and 1136 may not transmit a sound feature to the server 1110. Consequently, the usage of network resources to transmit the sound features can be reduced.

In some embodiments, a new device 1138 may join the similar context group when a context of the new device 1138 is found to be similar to that of the similar context group 1130. Specifically, the new device 1138 may transmit sound features extracted from an environmental sound to the server 1110. Thereafter, the server 1110 identifies a similar context group by comparing the sound features transmitted from the new device 1138 and the sound features from the leader device 1132. If the server 1110 determines that the sound features transmitted from the new device 1138 are similar to the sound features from the leader device 1132, the server 1110 may add the new device 1138 to the similar context group 1130.

In addition, the other mobile devices 1134 and 1136 may transmit a sound feature to the server 1110 only when a different environmental context is inferred. For example, the mobile device 1134 may infer a different environmental context when the mobile device 1134 moves to another place, since the location information of the mobile device is changed. In this case, the mobile device 1134 may transmit a new sound feature extracted from the changed environmental sound. Then, the server 1110 may exclude the mobile device 1134 from the previous similar context group 1130. It should be appreciated that operations at the mobile devices 1152, 1154, and 1156 of the group 1150 are performed in the same manner as the mobile devices 1132, 1134, and 1136 of the group 1130, and thus, a description thereof is omitted for brevity.

Figure 14:
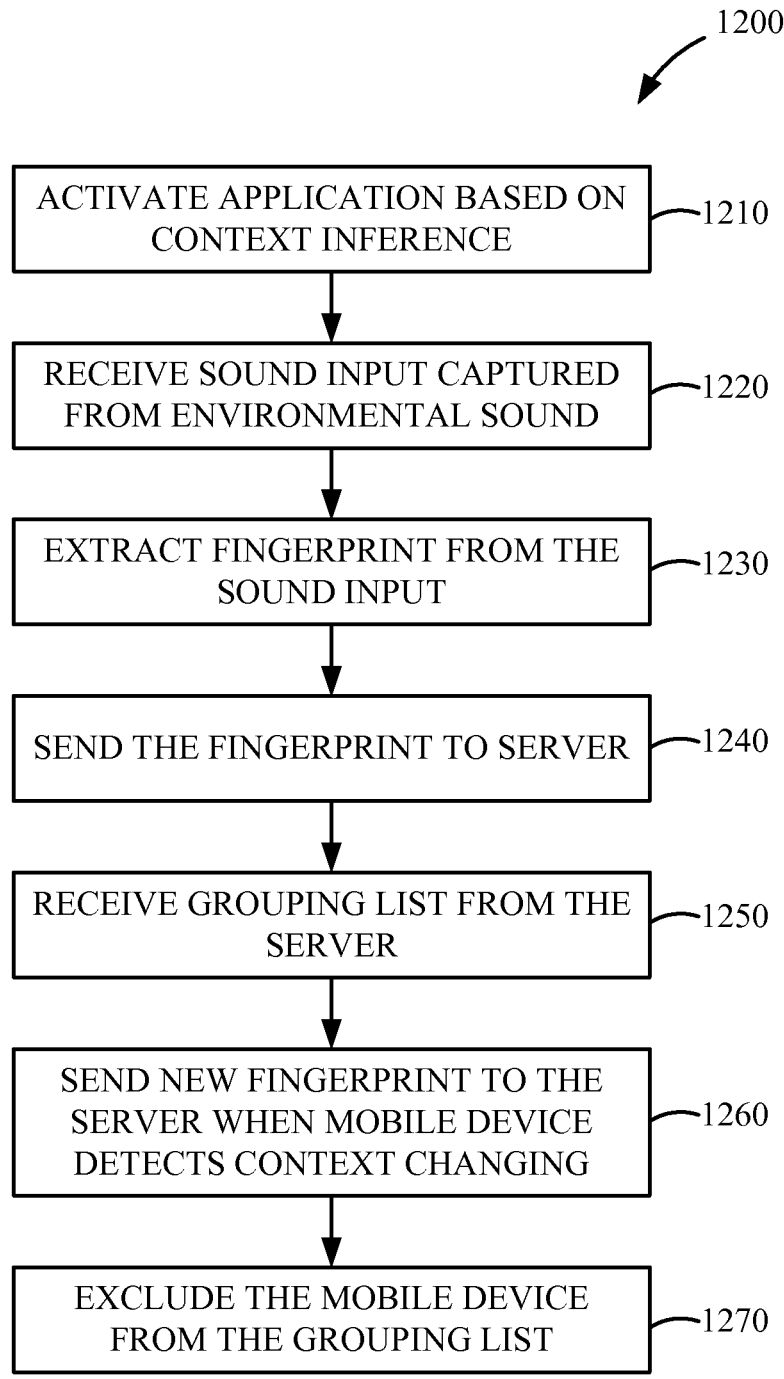
FIG. 14 illustrates a flowchart of a method for grouping mobile devices into a similar context group based on an inferred environmental context, according to some embodiments.

FIG. 14 illustrates a flowchart of a method 1200 for grouping mobile devices into a similar context group based on an inferred environmental context. At 1210, each mobile device activates an application based on environmental context inference (e.g., an application for searching the name of a song). At 1220, the mobile device receives a sound input captured from an environmental sound. At 1230, the mobile device extracts a sound fingerprint from the sound input.

After extracting the sound fingerprint, the mobile device transmits the sound fingerprint to a server at 1240. The server compares the sound fingerprints from multiple mobile devices ("client devices"), and groups the client devices into a similar context group by comparing the sound fingerprints (e.g., grouping mobile devices which receive same music) using any known comparison technique(s). Then, the server transmits the grouping list to the mobile device at 1250.

After grouping the client devices, the mobile device transmits a new sound fingerprint to the server when the mobile device detects that the environmental context is changed (e.g., change of light intensity, sound intensity, location, or network connection status) at 1260. The server receives the new sound fingerprint from the mobile device, and excludes the mobile device from the grouping list at 1270.

Figure 15:
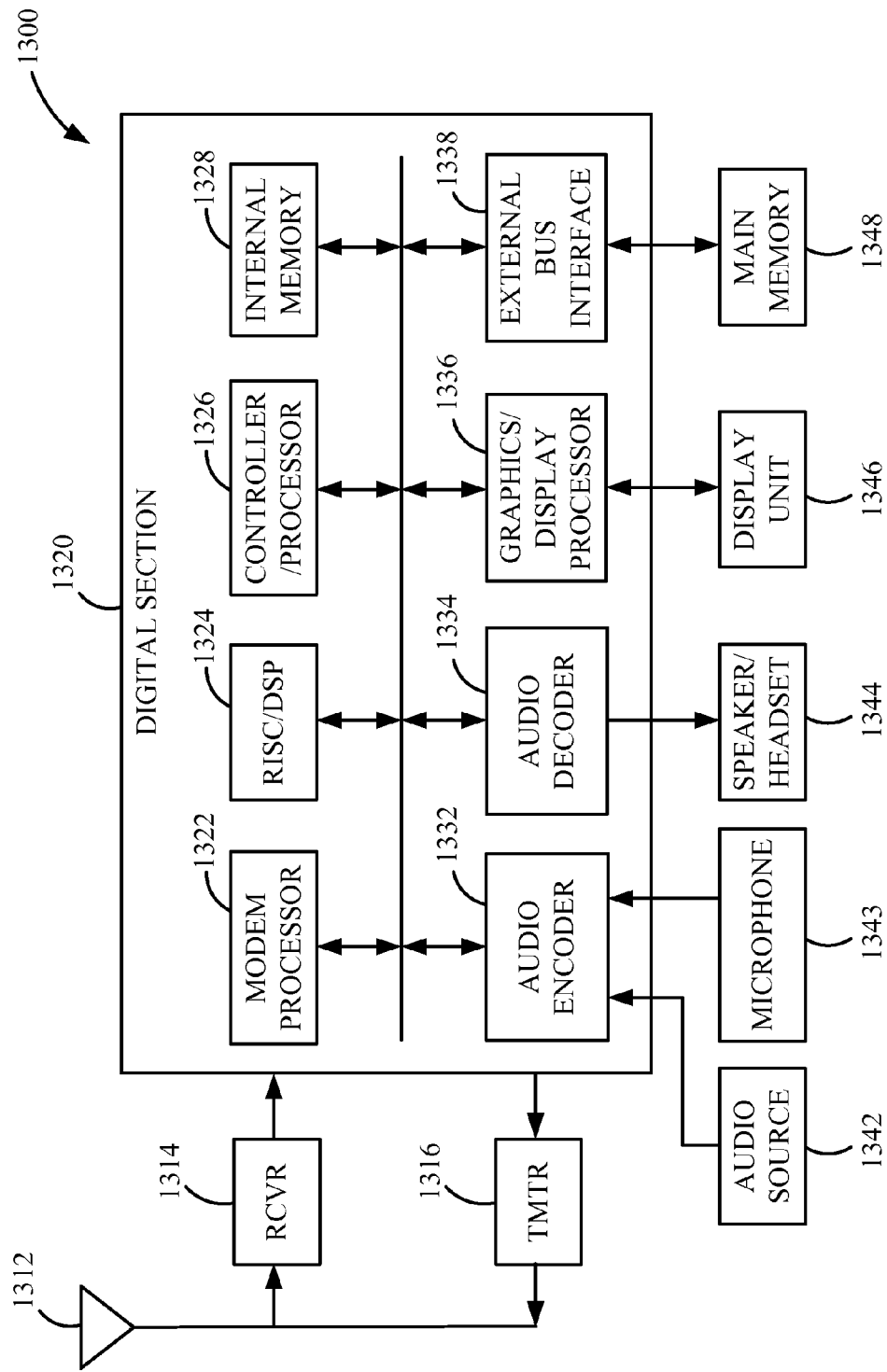
FIG. 15 is a block diagram of an exemplary mobile device having a wireless communication capability, according to some embodiments.

FIG. 15 is a block diagram of an exemplary mobile device 1300 having a wireless communication capability, according to some embodiments. The mobile device 1300 may be a cellular phone, a terminal, a handset, a personal digital assistant (PDA), a wireless modem, a cordless phone, and so on. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, and so on.

The mobile device 1300 may be capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides the conditioned and digitized signal to a digital section 1320 for further processing. On the transmit path, a transmitter (TMTR) receives data to be transmitted from a digital section 1320, processes and conditions the data, and generates a modulated signal, which is transmitted via the antenna 1312 to the base stations. The receiver 1314 and the transmitter 1316 are part of a transceiver that supports CDMA, GSM, W-CDMA, LTE, LTE Advanced, and so on.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio encoder 1332, a generalized audio decoder 1334, a graphics/display processor 1336, and/or an external bus interface (EBI) 1338. The modem processor 1322 performs processing for data transmission and reception, e.g., encoding, modulation, demodulation, and decoding. The RISC/DSP 1324 performs general and specialized processing for the wireless device 1300. The controller/processor 1326 controls the operation of various processing and interface units within the digital section 1320. The internal memory 1328 stores data and/or instructions for various units within the digital section 1320.

The generalized audio encoder 1332 performs encoding for input signals from an audio source 1342, a microphone 1343, and so on. The generalized audio decoder 1334 performs decoding for coded audio data and provides output signals to a speaker/headset 1344. It should be noted that the generalized audio encoder 1332 and the generalized audio decoder 1334 are not necessarily required for interface with the audio source, the microphone 1343, and the speaker/headset 1344, and thus are not shown in the mobile device 1300. The graphics/display processor 1336 performs processing for graphics, videos, images, and text, which is presented to a display unit 1346. The EBI 1338 facilitates the transfer of data between the digital section 1320 and a main memory 1348.

The digital section 1320 is implemented with one or more processors, DSPs, microprocessors, RISCs, etc. The digital section 1320 is also fabricated on one or more application specific integrated circuits (ASICs) and/or some other type of integrated circuits (ICs).

In general, any device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as an access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The context determining and grouping techniques described herein are implemented by various means. For example, these techniques are implemented in hardware, firmware, software, or combinations thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For hardware implementation, the processing units used to perform the techniques are implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling at least one application of a mobile device, the method comprising:
    capturing environmental information from at least one sensor of the mobile device, wherein the environmental information includes at least one environmental condition;
    inferring an environmental context of the mobile device based on the captured environmental information; and
    controlling at least one application of the mobile device based on a set of reference models associated with the inferred environmental context, wherein controlling the at least one application comprises setting a duty cycle of an audio codec based on the at least one environmental condition, wherein the audio codec monitors sound during a first portion of the duty cycle, and wherein the audio codec is idle during a second portion of the duty cycle.

2. The method of claim 1, wherein capturing the environmental information from the at least one sensor of the mobile device uses a first duty cycle, and inferring the environmental context of the mobile device from the environmental information uses a second duty cycle, and further comprising:
    configuring the first duty cycle and the second duty cycle based on the inferred environmental context.

3. The method of claim 2, further comprising controlling the first duty cycle using the inferred environmental context and an allowable latency of the at least one application.

4. The method of claim 2, further comprising controlling the second duty cycle using the inferred environmental context and an allowable latency of the at least one application.

5. The method of claim 1, wherein the at least one sensor comprises a light sensor, a sound sensor, a location sensor, or a global positioning system (GPS) module.

6. The method of claim 1, wherein setting the duty cycle of the audio codec includes configuring a duty ratio of the audio codec based on the at least one environmental condition, and wherein the duty ratio corresponds to a first amount of time that the audio codec monitors sound during the first portion of the duty cycle relative to a second amount of time that the audio codec is idle during the second portion of the duty cycle.

7. The method of claim 1, wherein the environmental information comprises at least one of sound, location, light intensity, motion, or time.

8. The method of claim 1, wherein controlling the at least one application further comprises activating the at least one application, deactivating the at least one application, controlling a network resource, or setting an allowable latency of the at least one application, and wherein controlling the at least one application is based on at least one of an output of a light sensor, location information indicative of a particular location, a level of a sound input, or at least one extracted sound feature.

9. The method of claim 1, further comprising activating a music search application or a television channel application when the environmental context indicates that an input sound is a reproduction of a sound source.

10. The method of claim 1, further comprising transmitting sound features to a server when the environmental context indicates that a network is activated.

11. The method of claim 1, further comprising:
receiving a sound input captured from an environmental sound;
extracting a sound feature from the sound input;
transmitting the sound feature to a server, wherein the server is configured to group a plurality of mobile devices into at least one similar context group based on a similarity of the sound features from the plurality of mobile devices and identify a leader device or a non-leader device in the at least one similar context group; and
receiving, from the server, information on the leader device or the non-leader device and the at least one similar context group.

12. The method of claim 11, wherein the server is used to group mobile devices based on their sound features, and further comprising indicating some devices in a group as leader devices, wherein the leader devices continuously send their sound feature to the server.

13. The method of claim 12, wherein each non-leader device sends its sound feature to the server when the non-leader device's environmental context is changed, and further comprising:
at the server,
receiving the sound input from the non-leader device;
finding a leader whose sound feature has a maximum similarity to that of the non-leader device; and
assigning the non-leader device to the group of the found leader device.

14. The method of claim 11, wherein if the non-leader device is the mobile device with the inferred environmental context, transmitting the sound feature includes transmitting a new sound feature to the server when a different environmental context is inferred in the mobile device.

15. A non-transitory computer-readable storage medium storing instructions for controlling at least one application of a mobile device, the instructions causing a processor to perform operations of:
capturing environmental information from at least one sensor of the mobile device, wherein the environmental information includes at least one environmental condition;
inferring an environmental context of the mobile device based on the captured environmental information; and
controlling at least one application of the mobile device based on a set of reference models associated with the inferred environmental context, wherein controlling the at least one application comprises setting a duty cycle of an audio codec based on the at least one environmental condition, wherein the audio codec monitors sound during a first portion of the duty cycle, and wherein the audio codec is idle during a second portion of the duty cycle.

16. The non-transitory computer-readable storage medium of claim 15, wherein capturing the environmental information from the at least one sensor of the mobile device uses a first duty cycle, and inferring the environmental context of the mobile device from the environmental information uses a second duty cycle, and further comprising instructions causing the processor to perform operations of:
configuring the first duty cycle and the second duty cycle based on the inferred environmental context.

17. The non-transitory computer-readable storage medium of claim 16, further comprising instructions causing the processor to perform operations of controlling the first duty cycle using the inferred environmental context and an allowable latency of the at least one application.

18. The non-transitory computer-readable storage medium of claim 16, further comprising instructions causing the processor to perform operations of controlling the second duty cycle using the inferred environmental context and an allowable latency of the at least one application.

19. The non-transitory computer-readable storage medium of claim 15, wherein the at least one sensor comprises a light sensor, a sound sensor, a location sensor, or a global positioning system (GPS) module.

20. The non-transitory computer-readable storage medium of claim 15, wherein the environmental information comprises at least one of sound, location, light intensity, motion, or time.

21. The non-transitory computer-readable storage medium of claim 15, wherein controlling the at least one application further comprises activating the at least one application, deactivating the at least one application, controlling a network resource, or setting an allowable latency of the at least one application, and wherein controlling the at least one application is based on at least one of an output of a light sensor, location information indicative of a particular location, a level of a sound input, or at least one extracted sound feature.

22. The non-transitory computer-readable storage medium of claim 15, further comprising instructions causing the processor to perform operations of activating a music search application or a television channel application when the environmental context indicates that an input sound is a reproduction of a sound source.

23. The non-transitory computer-readable storage medium of claim 15, further comprising instructions causing the processor to perform operations of transmitting sound features to a server when the environmental context indicates that a network is activated.

24. The non-transitory computer-readable storage medium of claim 15, further comprising instructions causing the processor to perform operations of:
   receiving a sound input captured from an environmental sound;
   extracting a sound feature from the sound input;
   transmitting the sound feature to a server, wherein the server is configured to group a plurality of mobile devices into at least one similar context group based on a similarity of the sound features from the plurality of mobile devices and identify a leader device or a non-leader device in the at least one similar context group; and
   receiving, from the server, information on the leader device or the non-leader device and the at least one similar context group.

25. The non-transitory computer-readable storage medium of claim 24, wherein the server is used to group mobile devices based on their sound features and to indicate some devices in a group as leader devices, wherein the leader devices continuously send their sound feature to the server.

26. The non-transitory computer-readable storage medium of claim 25, wherein each non-leader device sends its sound feature to the server when the non-leader device's environmental context is changed, and further comprising:
   at the server,
      receiving the sound input from the non-leader device;
      finding a leader whose sound feature has a maximum similarity to that of the non-leader device; and
      assigning the non-leader device to the group of the found leader device.

27. The non-transitory computer-readable storage medium of claim 24, wherein if the non-leader device is the mobile device with the inferred environmental context, transmitting the sound feature includes transmitting a new sound feature to the server when a different environmental context is inferred in the mobile device.

28. A mobile device for controlling at least one application, the mobile device comprising:
   means for capturing environmental information from at least one sensor of the mobile device, wherein the environmental information includes at least one environmental condition;
   means for inferring an environmental context of the mobile device based on the captured environmental information; and
   means for controlling at least one application of the mobile device based on a set of reference models associated with the inferred environmental context, wherein controlling the at least one application comprises setting a duty cycle of an audio codec based on the at least one environmental condition, wherein the audio codec monitors sound during a first portion of the duty cycle, and wherein the audio codec is idle during a second portion of the duty cycle.

29. The mobile device of claim 28, wherein capturing the environmental information from the at least one sensor of the mobile device uses a first duty cycle and inferring the environmental context of the mobile device from the environmental information uses a second duty cycle, and further comprising:
   means for configuring the first duty cycle and the second duty cycle based on the inferred environmental context.

30. The mobile device of claim 29, further comprising means for controlling the first duty cycle using the inferred environmental context and an allowable latency of the at least one application.

31. The mobile device of claim 29, further comprising means for controlling the second duty cycle using the inferred environmental context and an allowable latency of the at least one application.

32. The mobile device of claim 28, wherein the at least one sensor comprises a light sensor, a sound sensor, a location sensor, or a global positioning system (GPS) module.

33. The mobile device of claim 28, wherein the environmental information comprises at least one of sound, location, light intensity, motion, or time.

34. The mobile device of claim 28, wherein controlling the at least one application further comprises activating the at least one application, deactivating the at least one application, controlling a network resource, or setting an allowable latency of the at least one application, and wherein controlling the at least one application is based on at least one of an output of a light sensor, location information indicative of a particular location, a level of a sound input, or at least one extracted sound feature.

35. The mobile device of claim 28, further comprising means for activating a music search application or a television channel application when the environmental context indicates that an input sound is a reproduction of a sound source.

36. The mobile device of claim 28, further comprising means for transmitting sound features to a server when the environmental context indicates that a network is activated.

37. The mobile device of claim 28, further comprising:
   means for receiving a sound input captured from an environmental sound;
   means for extracting a sound feature from the sound input;
   means for transmitting the sound feature to a server, wherein the server is configured to group a plurality of mobile devices into at least one similar context group based on a similarity of the sound features from the plurality of mobile devices and identify a leader device or a non-leader device in the at least one similar context group; and
   means for receiving, from the server, information on the leader device or the non-leader device and the at least one similar context group.

38. The mobile device of claim 37, wherein the server is used to group mobile devices based on their sound features, and to indicate some devices in a group as leader devices, wherein the leader devices continuously send their sound feature to the server.

39. The mobile device of claim 38, wherein each non-leader device sends its sound feature to the server when the non-leader device's environmental context is changed, and further comprising:
   at the server,
      receiving the sound input from the non-leader device;
      finding a leader whose sound feature has a maximum similarity to that of the non-leader device; and
      assigning the non-leader device to the group of the found leader device.

40. The mobile device of claim 37, wherein if the non-leader device is the mobile device with the inferred environmental context, transmitting the sound feature includes transmitting a new sound feature to the server when a different environmental context is inferred in the mobile device.

41. A mobile device for controlling at least one application, the mobile device comprising:
   a receiver configured to capture environmental information from at least one sensor of the mobile device, wherein the environmental information includes at least one environmental condition;

a context inference unit configured to infer an environmental context of the mobile device based on the captured environmental information; and
an application control unit configured to control at least one application of the mobile device based on a set of reference models associated with an inferred environmental context, wherein controlling the at least one application comprises setting a duty cycle of an audio codec based on the at least one environmental condition, wherein the audio codec monitors sound during a first portion of the duty cycle, and wherein the audio codec is idle during a second portion of the duty cycle.

42. The mobile device of claim 41, wherein capturing the environmental information from the at least one sensor of the mobile device uses a first duty cycle, and inferring the environmental context of the mobile device from the environmental information uses a second duty cycle, and wherein the application control unit is further configured to control the first duty cycle and the second duty cycle based on the inferred environmental context.

43. The mobile device of claim 42, wherein the application control unit is further configured to control the first duty cycle using the inferred environmental context and an allowable latency of the at least one application.

44. The mobile device of claim 42, wherein the application control unit is further configured to control the second duty cycle using the inferred environmental context and an allowable latency of the at least one application.

45. The mobile device of claim 41, wherein the at least one sensor comprises a light sensor, a sound sensor, a location sensor, or a global positioning system (GPS) module.

46. The mobile device of claim 41, wherein the environmental information comprises at least one of sound, location, light intensity, motion, or time.

47. The mobile device of claim 41, wherein controlling the at least one application further comprises activating the at least one application, deactivating the at least one application, controlling a network resource, or setting an allowable latency of the at least one application, and wherein controlling the at least one application is based on at least one of an output of a light sensor, location information being indicative of a particular location, a level of a sound input, or at least one extracted sound feature.

48. The mobile device of claim 41, further comprising a performing unit for activating a music search application or a television channel application when the environmental context indicates that an input sound is a reproduction of a sound source.

49. The mobile device of claim 41, further comprising a transmitter configured to transmit sound features to a server when the environmental context indicates that a network is activated.

50. The mobile device of claim 41, further comprising:
a sound sensor configured to receive a sound input captured from an environmental sound;
a sound feature extractor configured to extract a sound feature from the sound input;
a transmitter configured to transmit the sound feature to a server, wherein the server is configured to group a plurality of mobile devices into at least one similar context group based on a similarity of the sound features from the plurality of mobile devices and identify a leader device or a non-leader device in the at least one similar context group; and
a group information receiver configured to receive, from the server, information on the leader device or the non-leader device and the at least one similar context group.

51. The mobile device of claim 50, wherein the server is used to group mobile devices based on their sound features and to indicate some devices in a group as leader devices, wherein the leader devices continuously send their sound feature to the server.

52. The mobile device of claim 51, wherein each non-leader device sends its sound feature to the server when the non-leader device's environmental context is changed, and further comprising:
at the server,
receiving the sound input from the non-leader device;
finding a leader whose sound feature has a maximum similarity to that of the non-leader device; and
assigning the non-leader device to the group of the found leader device.

53. The mobile device of claim 50, wherein if the non-leader device is the mobile device with the inferred environmental context, transmitting the sound feature includes transmitting a new sound feature to the server when a different environmental context is inferred in the mobile device.

\* \* \* \* \*